(12) United States Patent
Templeton

(10) Patent No.: US 11,137,771 B2
(45) Date of Patent: *Oct. 5, 2021

(54) METHODS AND SYSTEMS FOR TRANSPORTATION TO DESTINATIONS BY A SELF-DRIVING VEHICLE

(71) Applicant: Waymo LLC, Mountain View, CA (US)

(72) Inventor: Bradley Templeton, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/001,007

(22) Filed: Jun. 6, 2018

(65) Prior Publication Data

US 2018/0284809 A1    Oct. 4, 2018

Related U.S. Application Data

(63) Continuation of application No. 15/493,316, filed on Apr. 21, 2017, now Pat. No. 9,996,086, which is a (Continued)

(51) Int. Cl.
*G05D 1/02* (2020.01)
*G01C 21/34* (2006.01)
(Continued)

(52) U.S. Cl.
CPC .......... *G05D 1/0278* (2013.01); *B60W 30/06* (2013.01); *B60W 30/182* (2013.01); *B60W 40/08* (2013.01); *B60W 50/14* (2013.01); *G01C 21/3423* (2013.01); *G01C 21/3446* (2013.01); *G01C 21/3461* (2013.01); *G05D 1/0088* (2013.01); *G05D 1/0255* (2013.01); *G05D 1/0272* (2013.01); *B60W 2040/0818* (2013.01); *B60W 2050/146* (2013.01);
(Continued)

(58) Field of Classification Search
CPC .............. G05D 1/0278; G05D 1/0297; G05D 2201/021; G05D 2201/0202
See application file for complete search history.

(56) References Cited

U.S. PATENT DOCUMENTS

| | | | |
|---|---|---|---|
| 6,078,849 A * | 6/2000 | Brady | B60T 7/22 180/167 |
| 6,516,262 B2 | 2/2003 | Takenaga et al. | |

(Continued)

FOREIGN PATENT DOCUMENTS

| | | | | |
|---|---|---|---|---|
| EP | 0679974 A2 * | 11/1995 | ......... | B60K 31/0008 |
| EP | 0679976 A2 * | 11/1995 | ......... | B60K 31/0008 |
| EP | 0679976 A2 | 11/1995 | | |

*Primary Examiner* — Jean Paul Cass
(74) *Attorney, Agent, or Firm* — McDonnell Boehnen Hulbert & Berghoff LLP

(57) ABSTRACT

A vehicle configured to operate in an autonomous mode is provided. The vehicle is configured to obtain an indication of a final destination, and, if the final destination is not on a pre-approved road for travel by the vehicle, the vehicle is configured to determine a route from the vehicle's current location to an intermediary destination. The vehicle is further configured to determine a means for the vehicle user to reach the final destination from the intermediate destination.

19 Claims, 5 Drawing Sheets

Related U.S. Application Data continuation of application No. 13/630,017, filed on Sep. 28, 2012, now Pat. No. 9,665,101.

(51) Int. Cl.
*B60W 30/06* (2006.01)
*B60W 30/182* (2020.01)
*B60W 40/08* (2012.01)
*B60W 50/14* (2020.01)
*G05D 1/00* (2006.01)

(52) U.S. Cl.
CPC ..... *B60W 2420/42* (2013.01); *B60W 2420/52* (2013.01); *B60W 2540/26* (2013.01); *B60W 2556/00* (2020.02)

(56) References Cited

U.S. PATENT DOCUMENTS

| | | | |
|---|---|---|---|
| 7,451,852 B2 | 11/2008 | Stewart et al. | |
| 7,756,633 B2* | 7/2010 | Huang | G06Q 40/00 |
| | | | 701/517 |
| 7,934,577 B2 | 5/2011 | Walter et al. | |
| 8,126,642 B2* | 2/2012 | Trepagnier | G01S 17/86 |
| | | | 701/423 |
| 8,214,142 B2 | 7/2012 | Cerecke et al. | |
| 8,275,542 B2 | 9/2012 | Adachi et al. | |
| 8,311,973 B1* | 11/2012 | Zadeh | G06N 20/00 |
| | | | 706/62 |
| 8,406,986 B2* | 3/2013 | Boss | G06Q 50/26 |
| | | | 701/117 |
| 8,423,255 B2* | 4/2013 | Padmanabhan | G08G 1/0104 |
| | | | 701/70 |
| 8,630,897 B1* | 1/2014 | Prada Gomez | G06Q 30/0241 |
| | | | 705/14.11 |
| 8,706,394 B2* | 4/2014 | Trepagnier | G08G 1/16 |
| | | | 701/301 |
| 8,738,276 B1* | 5/2014 | Boss | G01C 21/3415 |
| | | | 701/117 |
| 8,949,016 B1* | 2/2015 | Ferguson | G05D 1/0274 |
| | | | 701/301 |
| 9,086,292 B2* | 7/2015 | Horvitz | G01C 21/3484 |
| 9,182,241 B2* | 11/2015 | Denaro | B60W 40/06 |
| 2001/0021888 A1* | 9/2001 | Burns | G05D 1/0278 |
| | | | 701/23 |
| 2004/0083031 A1 | 4/2004 | Okezie | |
| 2004/0162638 A1* | 8/2004 | Solomon | F41H 13/00 |
| | | | 700/247 |
| 2005/0002558 A1* | 1/2005 | Franke | G08G 1/123 |
| | | | 382/154 |
| 2005/0046569 A1* | 3/2005 | Spriggs | E01H 1/00 |
| | | | 340/551 |
| 2006/0167784 A1* | 7/2006 | Hoffberg | G06Q 50/188 |
| | | | 705/37 |
| 2007/0087756 A1* | 4/2007 | Hoffberg | G06Q 20/40 |
| | | | 455/450 |
| 2008/0027599 A1* | 1/2008 | Logan | G05D 1/0261 |
| | | | 701/23 |
| 2008/0162027 A1 | 7/2008 | Murphy et al. | |
| 2009/0313095 A1* | 12/2009 | Hurpin | G06Q 20/127 |
| | | | 705/13 |
| 2010/0317420 A1* | 12/2010 | Hoffberg | G07F 17/323 |
| | | | 463/1 |
| 2011/0264360 A1* | 10/2011 | Boss | B61L 27/00 |
| | | | 701/117 |
| 2012/0072051 A1* | 3/2012 | Koon | G05D 1/0278 |
| | | | 701/2 |
| 2012/0089299 A1* | 4/2012 | Breed | B60N 2/888 |
| | | | 701/36 |
| 2014/0129122 A1* | 5/2014 | Boss | G08G 1/127 |
| | | | 701/117 |
| 2014/0201126 A1* | 7/2014 | Zadeh | A61B 5/165 |
| | | | 706/52 |
| 2015/0057891 A1* | 2/2015 | Mudalige | B60W 10/18 |
| | | | 701/42 |

* cited by examiner

METHODS AND SYSTEMS FOR TRANSPORTATION TO DESTINATIONS BY A SELF-DRIVING VEHICLE

CROSS-REFERENCE TO RELATED APPLICATION

This application is a continuation of U.S. patent application Ser. No. 15/493,316 filed Apr. 21, 2017, which is a continuation of U.S. patent application Ser. No. 13/630,017 filed Sep. 28, 2012, the contents of both of which are hereby incorporated by reference.

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes a mapped knowledge of a graph of roads which is a subset of all known roads, and one or more sensors that are configured to sense information about the environment. The vehicle is thus able to drive on the graph of roads in the autonomous mode.

SUMMARY

In a first aspect, a method is provided. The method includes receiving, by a computer system, an input indicating a final destination, wherein the computer system is configured to control a vehicle in an autonomous mode. The method further includes determining that the final destination is not on a pre-approved road for travel by the vehicle in the autonomous mode, and selecting a route from a vehicle's current location to an intermediary destination. The route comprises one or more pre-approved roads for travel by the vehicle in the autonomous mode. The method further includes controlling the vehicle in the autonomous mode, based on the route, to reach the intermediary destination, and determining, by the computer system, a means to reach the final destination.

In a second aspect, a vehicle is provided. The vehicle includes a user interface, a sensor system, and a computer system. The vehicle is configured to operate in an autonomous mode. The user interface is configured to obtain an indication of a final destination. The computer system is configured to determine that the final destination is not on a road that is pre-approved for travel in the autonomous mode and in response, to select a route from the vehicle's current location to an intermediary destination. The computer system is configured to then control the vehicle in the autonomous mode, based on the route, to reach the intermediary destination.

In a third aspect, a non-transitory computer readable medium having stored instructions is provided. The instructions are executable by a computer system to cause the computer system to perform functions. The functions include receiving, by a computer system, an input indicating a final destination, wherein the computer system is configured to control a vehicle in an autonomous mode. The functions further include determining that the final destination is not on a pre-approved road for travel by the vehicle in the autonomous mode, and selecting a route from a vehicle's current location to an intermediary destination. The route comprises one or more pre-approved roads for travel by the vehicle in the autonomous mode. The functions further include controlling the vehicle in the autonomous mode, based on the route, to reach the intermediary destination, and determining, by the computer system, a means to reach the final destination.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure relates to apparatuses and methods for transportation to destinations by a self-driving vehicle.

1. Overview

Some methods disclosed herein may be carried out in part or in full by a vehicle configured to operate in an autonomous mode with or without external interaction (e.g., such as from a user of the vehicle). Other methods disclosed herein may be carried out in part or in full by a server. In example embodiment, a server may receive data from the vehicle, from a user input, and/or from one or more sensors observing one or more aspects of an environment of a vehicle. In some embodiments, the sensor data could be transmitted to the server using a wireless communication system. Other interactions between a vehicle operating in an autonomous mode and a server are possible within the context of the disclosure.

Also disclosed herein are non-transitory computer readable media with stored instructions. The instructions could be executable by a computing device to cause the computing device to perform functions similar to those described in the methods described below.

Figure 1:
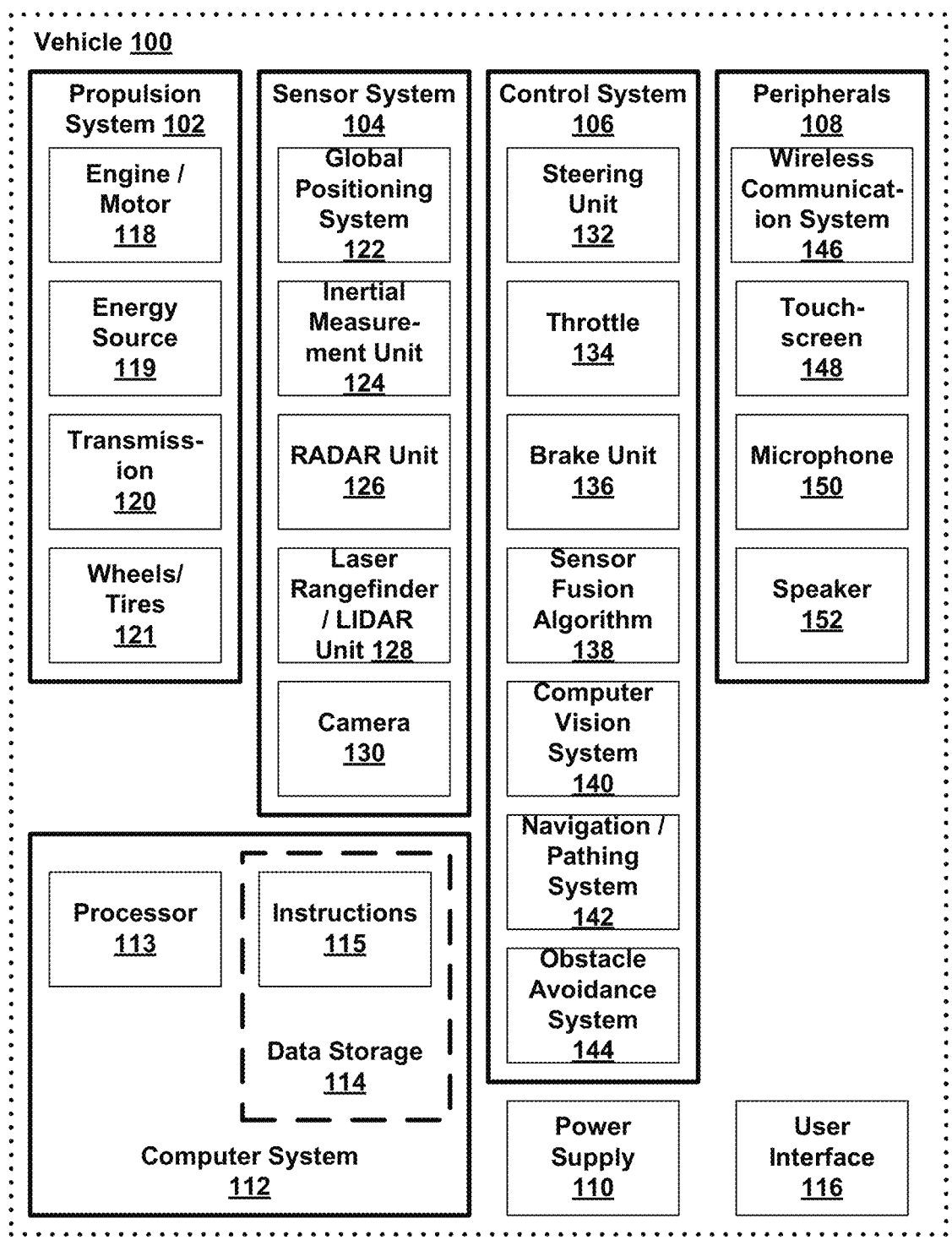
FIG. 1 is a functional block diagram illustrating a vehicle in accordance with an example embodiment.

FIG. 1 is a functional block diagram illustrating a vehicle 100 in accordance with an example embodiment. The vehicle 100 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 100 may be configured to operate fully or partially in an autonomous mode. For example, the vehicle 100 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components or combined into fewer functional or physical components. In some further examples, additional functional and physical components may be added to the examples illustrated by FIG. 1.

The propulsion system 102 may include components operable to provide powered motion for the vehicle 100. In an example embodiment, the propulsion system 102 may include an engine 118, an energy source 119, a transmission 120, and wheels 121. The engine 118 may be any combination of an internal combustion engine, an electric motor, steam engine, Stirling engine, or other types of engines or motors. In some example embodiments, the engine 118 may be configured to convert energy source 119 into mechanical energy. In some example embodiments, the propulsion system 102 may include multiple types of engines or motors. For instance, a gas-electric hybrid car could include a gasoline engine and an electric motor. Other examples are possible.

The energy source 119 may represent a source of energy that may, in full or in part, power the engine 118. That is, the engine 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, or flywheels. The energy source 119 may also provide energy for other systems of the vehicle 100.

The transmission 120 may include elements that are operable to transmit mechanical power from the engine 118 to the wheels 121. To this end, the transmission 120 could include a gearbox, a clutch, a differential, and drive shafts. The transmission 120 may include other elements. The drive shafts may include one or more axles that could be coupled to the one or more wheels 121.

The wheels 121 of the vehicle 100 may be tires. The wheels 121 of the vehicle 100 may be configured in various formats, including a unicycle, bicycle, tricycle, or a four-wheel format, such as on a car or a truck, for example. Other wheel geometries are possible, such as those including six or more wheels. Any combination of the wheels 121 of vehicle 100 may be operable to rotate differentially with respect to other wheels 121. The wheels 121 may represent at least one wheel that is fixedly attached to the transmission 120 and at least one tire coupled to a rim of the wheel that could make contact with the driving surface. The wheels 121 may include a combination of metal and rubber, or another combination of materials.

The sensor system 104 may include a number of sensors configured to sense information about an environment of the vehicle 100. For example, the sensor system 104 may include a Global Positioning System (GPS) 122, an inertial measurement unit (IMU) 124, a RADAR unit 126, a laser rangefinder/LIDAR unit 128, and a camera 130. The sensor system 104 may also include sensors configured to monitor internal systems of the vehicle 100 (e.g., an $O_2$ monitor, a fuel gauge, an engine oil temperature). Other sensors are possible as well.

One or more of the sensors included in the sensor system 104 may be configured to be actuated separately or collectively in order to modify a position, an orientation, or both, of the one or more sensors.

The GPS 122 may be any sensor configured to estimate a geographic location of the vehicle 100. To this end, the GPS 122 may include a transceiver operable to provide information regarding the position of the vehicle 100 with respect to Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and the heading of the objects.

Similarly, the laser rangefinder or LIDAR unit 128 may be any sensor configured to sense objects in the environment in which the vehicle 100 is located using lasers. In an example embodiment, the laser rangefinder/LIDAR unit 128 may include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment of the vehicle 100. The camera 130 may be a still camera or a video camera.

The control system 106 may be configured to control operation of the vehicle 100 and its components. Accordingly, the control system 106 may include various elements such as a steering unit 132, a throttle 134, a brake unit 136, a sensor fusion algorithm 138, a computer vision system 140, a navigation/pathing system 142, and an obstacle avoidance system 144.

The steering unit 132 may represent any combination of mechanisms that may be operable to adjust the heading of vehicle 100.

The throttle 134 may be configured to control, for instance, the operating speed of the engine 118 and, in turn, control the speed of the vehicle 100.

The brake unit 136 could include any combination of mechanisms configured to decelerate the vehicle 100. The brake unit 136 could use friction to slow the wheels 121. In other embodiments, the brake unit 136 may convert the kinetic energy of the wheels 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, a Bayesian network, or other algorithm. The sensor fusion algorithm 138 may further provide various assessments based on data from the sensor system 104. In an example embodiment, the assessments may include evaluations of individual objects or features in the environment of the vehicle 100, evaluation of a particular situation, and evaluate possible impacts based on the particular situation. Other assessments are possible.

The computer vision system 140 may be any system operable to process and analyze images captured by the camera 130 in order to identify objects or features in the environment of the vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path or route for the vehicle 100. The navigation and pathing system 142 may additionally be configured to update the driving path dynamically while the vehicle 100 is in operation. In some embodiments, the navigation and pathing system 142 may be configured to incorporate data from the sensor fusion algorithm 138, the GPS 122, and one or more predetermined maps so as to determine the driving path for the vehicle 100.

The obstacle avoidance system 144 may represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, the peripherals 108 may include a wireless communication system 146, a touchscreen 148, a microphone 150, and a speaker 152.

In an example embodiment, the peripherals 108 may provide, for instance, means for a user of the vehicle 100 to interact with the user interface 116. To this end, the touchscreen 148 may provide information to a user of the vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to a user of the vehicle 100.

In one example, the wireless communication system 146 may be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 may communicate with a wireless local area network (WLAN), for example, using WiFi. In some embodiments, the wireless communication system 146 may communicate directly with a device, for example, using an infrared link, Bluetooth, or ZigBee. Other wireless protocols, such as various vehicular communication systems, are possible within the context of the disclosure. For example, the wireless communication system 146 may include one or more dedicated short range communications (DSRC) devices that may include public or private data communications between vehicles and/or roadside stations.

The power supply 110 may provide power to various components of the vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 at during the operation of the vehicle 100 in the autonomous, semi-autonomous, and/or manual modes.

The vehicle 100 may include a user interface 116 for providing information to or receiving input from a user of the vehicle 100. The user interface 116 may control or enable control of content and the layout of interactive images that may be displayed on the touchscreen 148. Further, the user interface 116 may include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be operable to provide control over many aspects of the vehicle 100 and its subsystems.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired or wireless fashion.

Figure 2:
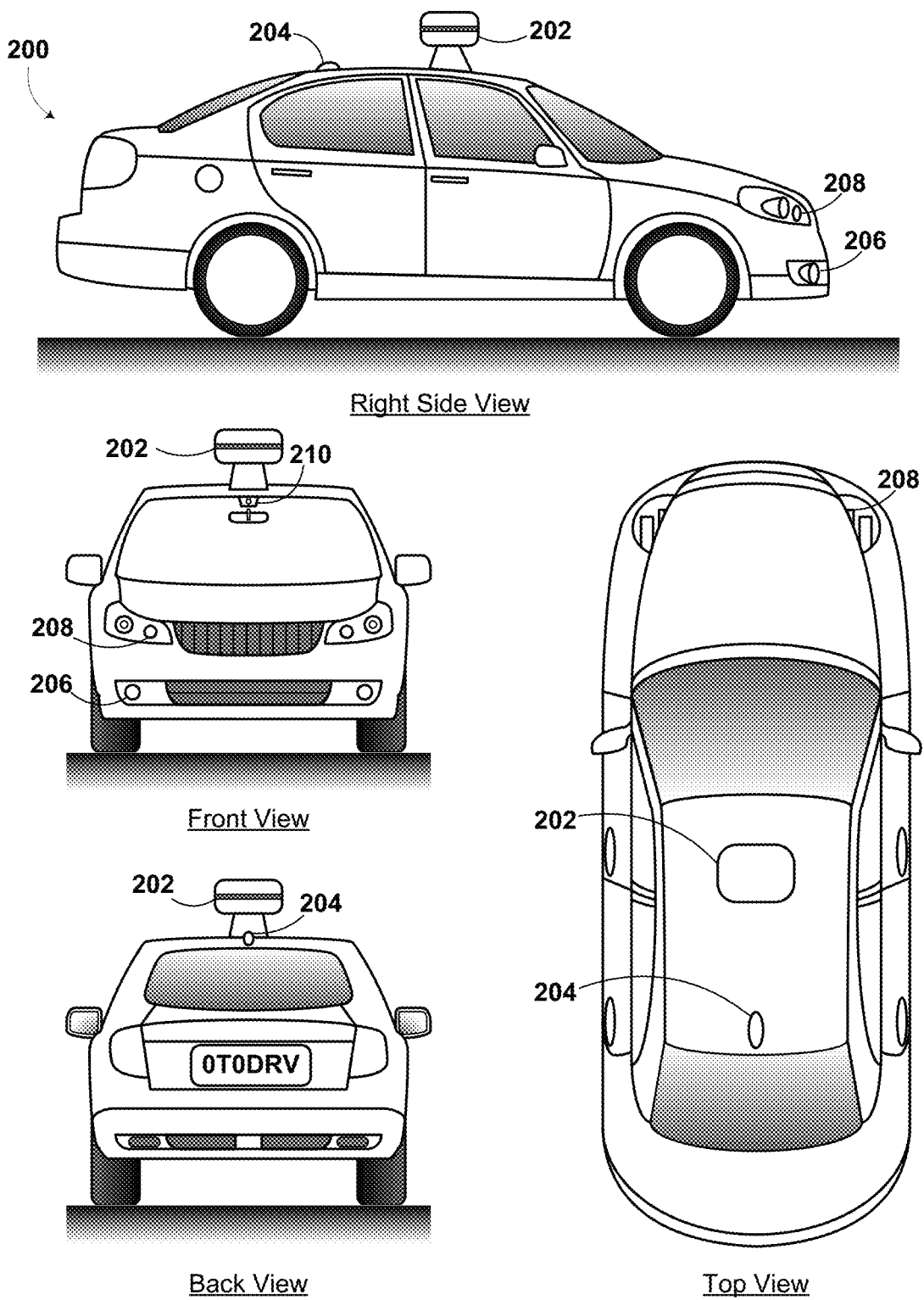
FIG. 2 is a vehicle in accordance with an example embodiment.

FIG. 2 is a vehicle 200 in accordance with an example embodiment. FIG. 2 shows a vehicle 200 that could be similar or identical to the vehicle 100 described in reference to FIG. 1. Although the vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, the vehicle 200 includes a sensor unit 202, a wireless communication system 204, a LIDAR unit 206, a laser rangefinder unit 208, and a camera 210. The vehicle 200 may include some or all of the elements described with reference to FIG. 1.

The sensor unit 202 may include one or more different sensors configured to capture information about an environment surrounding the vehicle 200. For example, sensor unit 202 could include any combination of cameras, RADARs, LIDARs, range finders, and acoustic sensors. Other types of sensors are possible. In an example embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 may be located on a roof of the vehicle 200, as depicted in FIG. 2. Alternatively, the wireless communication system 204 may be located, fully or in part, elsewhere. The wireless communication system 204 may include wireless transmitters and receivers that could be configured to communicate with devices external or internal to the vehicle 200. Specifically, the wireless communication system 204 may include transceivers configured to communicate with other vehicles or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern, and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object. As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 may be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 may have associated optics that could be operable to provide an adjustable field of view. Further, the camera 210 may be mounted to the vehicle 200 with a movable mount that could be operable to vary a pointing angle of the camera 210.

Within the context of the present disclosure, the components of the vehicle 100 and the vehicle 200 may be configured to work in an interconnected fashion with other components within or outside their respective systems.

2. Example Implementations

Several example implementations will now be described herein. It will be understood that there are many ways to implement the devices, systems, and methods disclosed herein. Accordingly, the following examples are not intended to limit the scope of the present disclosure.

In the manual and semi-autonomous modes, a vehicle is driven entirely and partially, respectively, by a user. In contrast, in a fully autonomous mode, a vehicle, such as the vehicle 100 or the vehicle 200 for example, is driven with little or no user interaction. One example where a fully autonomous mode may be desired is when a vehicle user who is not licensed wishes to take a vehicle to get to a destination. In another example, a fully autonomous mode may be desired for a vehicle user who has an impairment that prevents the user from operating the vehicle in any manner; e.g., who is impaired due to fatigue or alcohol consumption, for example. Still other examples may be envisioned where it would be advantageous to operate a vehicle in a fully autonomous mode.

Figure 3:
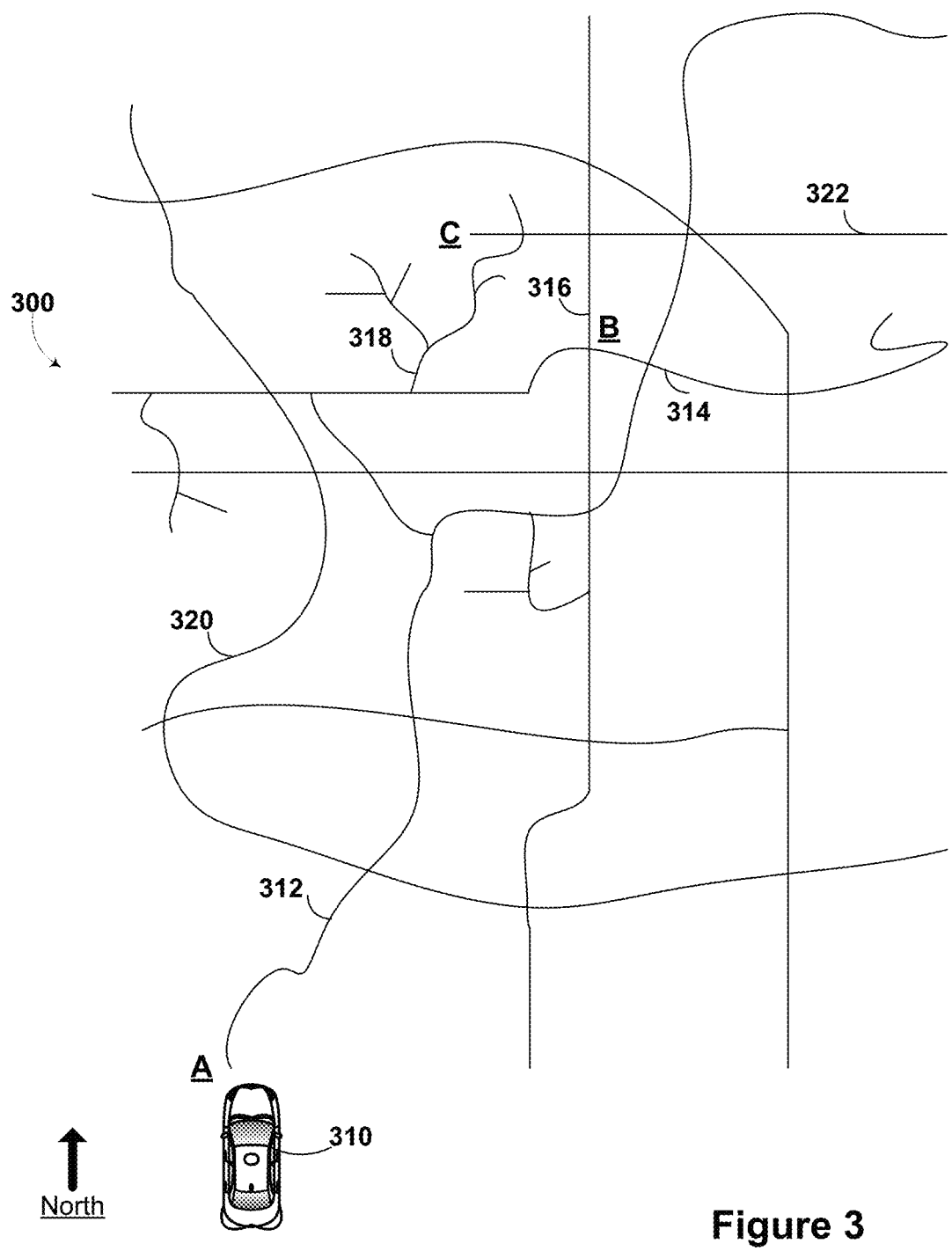
FIG. 3 is a schematic illustrating an autonomous vehicle operating scenario in accordance with an example embodiment.

FIG. 3 is a schematic illustrating an autonomous vehicle operating scenario 300 in accordance with an example embodiment. In scenario 300, a vehicle 310 is first positioned at an initial location A. Vehicle 310 may be similar or identical to the vehicles 100 and 200 with reference to FIGS. 1 and 2, respectively.

A user of vehicle 310 may want to get to a final destination C, yet may be incapacitated from operating the vehicle 310. In operating scenario 300, the vehicle user may thus opt to operate the vehicle 310 in a fully autonomous mode. The vehicle user may select the fully autonomous mode to reach the final destination C using a number of input methods known in the art.

In the fully autonomous mode, the vehicle 310 may not be operable on all roads, but instead may only be operable to drive on a subset of all roads. For example, the vehicle 310 may be operable to drive on roads that are mapped by the vehicle's computer system and pre-approved for driving in the fully autonomous mode. The pre-approved subset of roads may be stored in the data storage or memory of the vehicle 310. The pre-approved subset of roads may be stored as a "drivable graph" that represents a map comprising only the pre-approved subset of roads. This drivable graph may be superimposed on or otherwise associated with a map showing all known roads, and the vehicle 310 may refer to only one or both maps when needed. In another example, the drivable graph may be a map that includes all known roads, and the pre-approved subset of roads may be highlighted or otherwise indicated on the map.

Upon receiving input information to drive to the final destination C as well as an indication that the vehicle user is unable to assist with driving, the vehicle 310 may analyse its drivable graph to first determine whether the final destination C is located along the pre-approved subset of roads. If the final destination C is located along the pre-approved subset of roads, the vehicle 310 may proceed to drive in the fully autonomous mode to the final destination C. If the final destination C is not located along the vehicle's 310 pre-approved set of roads, however, the vehicle 310 may then locate various potential stopping points along the pre-approved set of roads. The potential stopping points may be locations that are near the final destination C. The vehicle will then choose from among the potential stopping points a single stopping point to serve as intermediary destination B.

An intermediary destination B may include a stopping point that has the shortest drive to the final destination C, the shortest walk to the final destination C, or the lowest average taxi fare to the final destination C, for example. In other examples, the intermediary destination B may include a suitable facility for a long-term stay; for example, a building with a heated waiting area, or a hotel for overnight stay. The vehicle 310 may have stored in memory or have access to, via the internet, facilities which will provide a place to sleep for a limited time. The vehicle 310 may choose the best such facility based on the proximity to the final destination C, the price, the rating or other quality indicator of the facility, or input from the vehicle user for example. In this example, after the vehicle user has completed his or her extended stay at the intermediary destination B, the vehicle user may be able to operate the vehicle 310 in an unassisted or commute-assist mode to drive the vehicle 310 to the final destination C.

To make the determination of which potential stopping point will be intermediary destination B, the vehicle may use a number of graph theory algorithms known in the art. In some example embodiments, input from the vehicle user may assist in making the determination. In still other example embodiments, factors that prevent the vehicle user from driving may also be taken into account by the vehicle in making the determination. For example, if the vehicle user is physically disabled, the vehicle may eliminate options where the vehicle user would have to utilize physical functions they do not possess to get from the intermediary destination B to the final destination C. In another example, if the vehicle user is a child, the vehicle may only allow acceptable potential stopping places to come from a list of pre-selected stopping places input by a parent, guardian, or other care taker.

After the vehicle 310 has made a determination of a suitable intermediary destination B, the vehicle drives to the intermediary destination B along the subset of roads. In the example scenario 300, the roads that comprise the subset of roads are roads 312, 314, 316, 318, and 320. Road 322 is not part of the subset of roads that is pre-approved for the vehicle 310 to drive on in the fully autonomous mode. As can be seen in FIG. 3, there are a number of potential stopping points along the subset of roads that could be selected as the intermediary destination; however, in this particular scenario the intermediary destination was determined to be location B. Roads 312 and 314 may be used by the vehicle 310 to reach the intermediary destination B. Alternatively, roads 312 and 316 may be used by the vehicle 310 to reach the intermediary destination B. Other possibilities for routes to the intermediary destination B also exist.

Upon arrival at the intermediary destination B, the vehicle 310 may stop and turn off, leaving the vehicle user to complete the last leg of the journey to the final destination C. Alternatively, the vehicle 310 may remain on and initiate a request for transportation from the intermediary destination B to the final destination C. In one example, the vehicle 310 may request a taxi. This request may be placed by the vehicle 310 over a wireless communication system, such as the wireless communication system 146 of FIG. 1, and may be performed prior to the vehicle 310 arriving at the intermediary destination so that a taxi is waiting or just arriving at the intermediary destination when the vehicle 310 arrives. In another example, the vehicle 310 may provide a suggestion to the vehicle user to contact an entity to give the vehicle user a ride to final destination C. If the vehicle 310 is aware of another transit vehicle that will be approaching the intermediary destination B, such as a bus or train, for example, the vehicle 310 may inform the vehicle user of such, as well as the estimated time of arrival.

In the above described example scenario 300, the vehicle user may have arranged in advance for the fully autonomous mode of operation of the vehicle 310. In one example, when the vehicle user parks the vehicle 310 at a bar located at initial location A, the vehicle user may provide a command to the vehicle 310 that the user wants a restricted mode of operation in the near future. In this example, when the user informs the vehicle 310 that he or she wants a restricted mode of operation, the vehicle 310 may responsively trigger the vehicle 310 to operate in a fully autonomous mode. If the vehicle user subsequently wants to remove the fully autonomous mode setting or otherwise drive the vehicle 310, the vehicle user may be required to demonstrate that he or she is able to operate the vehicle, e.g., non-impairment. In another example, the vehicle user may simply inform the vehicle 310 that he or she plans to drink at a bar. This information may trigger the vehicle 310 to operate in a fully autonomous mode. If the vehicle user subsequently wants to remove the fully autonomous mode setting or otherwise drive the vehicle 310, the vehicle user may be required to demonstrate that he or she is able to operate the vehicle, e.g., non-impairment A variety of non-impairment tests may be used that are known in the art. Some examples of non-impairment tests are breathing into sensors, solving given problems, and demonstrating good reaction time to the vehicle system. Sensors may be associated with the vehicle computer system. When a user breathes into the sensors, the blood alcohol concentration from the breath is measured and the measurement is registered by the computer system. The vehicle may administer, via the user interface, a problem or number of problems for the vehicle user to solve. A problem may thus appear on the user interface and the vehicle user may respond to the problem by inputting an answer into the user interface. One example of a possible demonstration of a good reaction time to the vehicle system is the vehicle displaying a driving simulation on a screen and then times the user's response, such as pressing a brake or turning a wheel, to ensure the user does so within an appropriate time window. In another example, the vehicle system may display a video game and buttons in the vehicle may be used as input controllers by a user, the response times to the video game scenarios would then be measured by the vehicle system. In yet another example, a beep or other command such as "hit the left turn signal" may be output by the vehicle system and a user's reaction time may thereafter be measured by the vehicle system. Still other examples may be envisioned.

In one example embodiment, the vehicle user may, in exchange for informing the vehicle 310 that the user will be impaired in the near future, be given a token or other measure of proof in exchange for providing the information. This token may be required by providers of alcohol in a manner similar to demanding a patron have a designated driver. In one example, the vehicle user may have a special key that is different from the master key used to operate the vehicle system. The special key may only allow for operation in the autonomous mode, or may require a test such as those described above before allowing for manual driving. A child or a user planning to drink may be given such a key, for example.

In an alternative example, the vehicle user may simply declare him or herself too impaired to drive at the time of entering the vehicle for departure to destination C. In one example, the vehicle user may utter an audio command into a microphone on the vehicle 310, informing the vehicle 310 that the user is impaired and/or that the vehicle 310 should operate in the autonomous mode. In another example, the vehicle user may manually input the information that the user is impaired into the vehicle's user interface. In yet another example, the vehicle 310 may have a fully autonomous button or impairment button that a vehicle user can press to trigger the autonomous mode.

3. Example Methods

As mentioned, a vehicle may be configured to receive an indication of a final destination, and may responsively determine a route to come close to the final destination, as well as determine how to get a user of the vehicle to the final destination.

Figure 4:
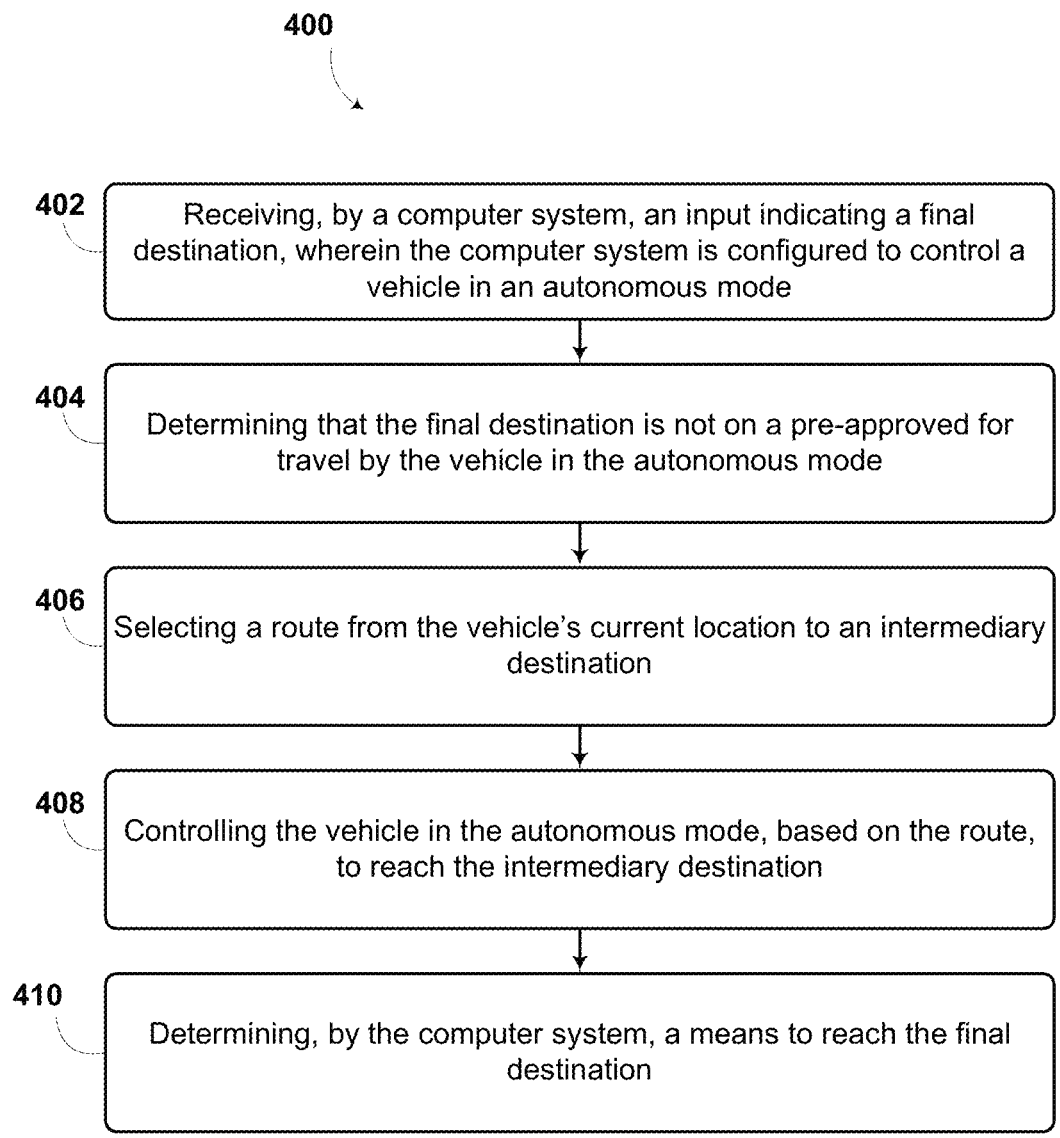
FIG. 4 is a flowchart of a process for providing an autonomous vehicle in accordance with an example embodiment.

FIG. 4 is a flowchart of a process for providing an autonomous vehicle in accordance with an example embodiment. Method 400 shown in FIG. 4 presents an embodiment of a method that, for example, could be used with the vehicles 100, 200, and 310 described with reference to FIGS. 1-3, respectively. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments.

At block 402, the method includes receiving, by a computer system, an input indicating a final destination. The computer system is configured to control a vehicle, such as the vehicles 100, 200, and 310 described with reference to FIGS. 1-3, respectively, in an autonomous mode. In some example embodiments, the vehicle may obtain the indication via a touchscreen on a user interface, a microphone, or other input mechanism. In another example embodiment, a server may obtain the indication and may wire or wirelessly transmit the indication to the vehicle. The server may transmit the indication to the vehicle via a communication system such as the wireless communication system 148 described with reference to FIG. 1, for example.

At block 404, the method includes determining that the final destination is not on a pre-approved road for travel by the vehicle in the autonomous mode. A road may be deemed to be pre-approved after the road has been sufficiently tested and placed on a driveable graph for autonomous vehicles. Testing may include driving a one or more autonomous vehicles under supervision on the road at issue under, using sensor or camera data to observe the road and surrounding environment and storing the data in memory for future use by autonomous vehicles, for example. A road or a zone may be approved for supervised, semi-autonomous travel but not for autonomous travel. For example, a zone may be deemed more risky for autonomous travel if the zone includes high pedestrian traffic, school zones, places of occluded vision or radar noise. In another example, even if a road is approved for autonomous travel, the autonomous mode may be not desired for use if a data connection is unavailable to summon help should help become desired.

At block 406, the method includes selecting a route from the vehicle's current location to an intermediary destination. The route comprises one or more pre-approved roads for travel by the vehicle. The intermediary destination may be located between the current location and the final destination. However, a goal of the intermediary destination is to help a vehicle user who cannot drive a vehicle get to the final destination; thus, if another mode of transportation is located further away from the final destination than the current location (e.g., a bus or train stop) but can more expediently take the user to the final destination, this location may be selected as the intermediate destination.

The route to the intermediary destination may comprise roads that are provided in a database of pre-approved roads for travel by the vehicle. The database may be stored in data storage, such as the data storage 114 in the vehicle of FIG. 1, for example. The database may be continuously updated with additional mapped and pre-approved roads for travel as more roads are tested by autonomous vehicles. However, the database may not include all known roads for travel, and may not include roads that reach the final destination. Thus, a desirable intermediary destination may be determined and subsequently, a route may be mapped to the intermediary destination instead of the final destination. The intermediary destination may be desirable for a number of reasons. As previously discussed with reference to FIG. 3, a destination may be selected as the intermediary destination because of its proximity to public transportation, such as a bus stop, a train stop, or the like. In another example, a destination may be selected as the intermediary destination because of proximity to a walking path to the final destination. Still other examples may be envisioned. A map may be created by the vehicle that includes the pre-approved roads for travel, such as the maps discussed with reference to FIG. 3.

The route may be determined based on a number of factors, and the vehicle may use a number of graph theory algorithms known in the art to make the determination. In some example embodiments, input from the vehicle user may assist in making the determination. In still other example embodiments, factors that prevent the vehicle user from driving may also be taken into account by the vehicle in making the determination.

At block 408, the method includes controlling the vehicle in the autonomous mode, based on the route, to reach the intermediary destination. The vehicle thus drives autonomously along the determined route from its current location to the intermediary destination.

At block 410, the method includes determining, by the computer system, a means to reach the final destination. Before or upon arrival at the intermediary destination, the vehicle may take action to help the vehicle user reach his or her final destination. The vehicle may have determined the means to reach the final destination prior to reaching the intermediary destination and the determination of the means may be included as an input factor for the graph theory algorithm that may be used to determine what intermediary destination to select. Alternatively, the vehicle may determine the means to reach the final destination upon reaching the intermediary destination. The vehicle may request or receive the vehicle user's input (or input from another source) to aid in forming the determination. For example, the vehicle may ask the vehicle user what form of transportation the user prefers to take: public transportation or an individualized service, such as a taxi service. The vehicle may also take into account variables such as the time of day, and/or sensor information regarding the surroundings at the intermediary destination to make the determination. The vehicle may synchronize actions taken to arrive at the final destination such that upon arrival at the intermediary destination, the means to reach the final destination are already at the intermediary destination. As discussed with reference to FIG. 3, a number of means to reach the intermediary destination may be used.

The vehicle and any on-board computer systems could control the vehicle in the autonomous mode. Alternatively, computer systems, such as a server network, could be used to control some or all of the functions of the vehicle in the autonomous mode.

Example methods, such as the method 400 of FIG. 4, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
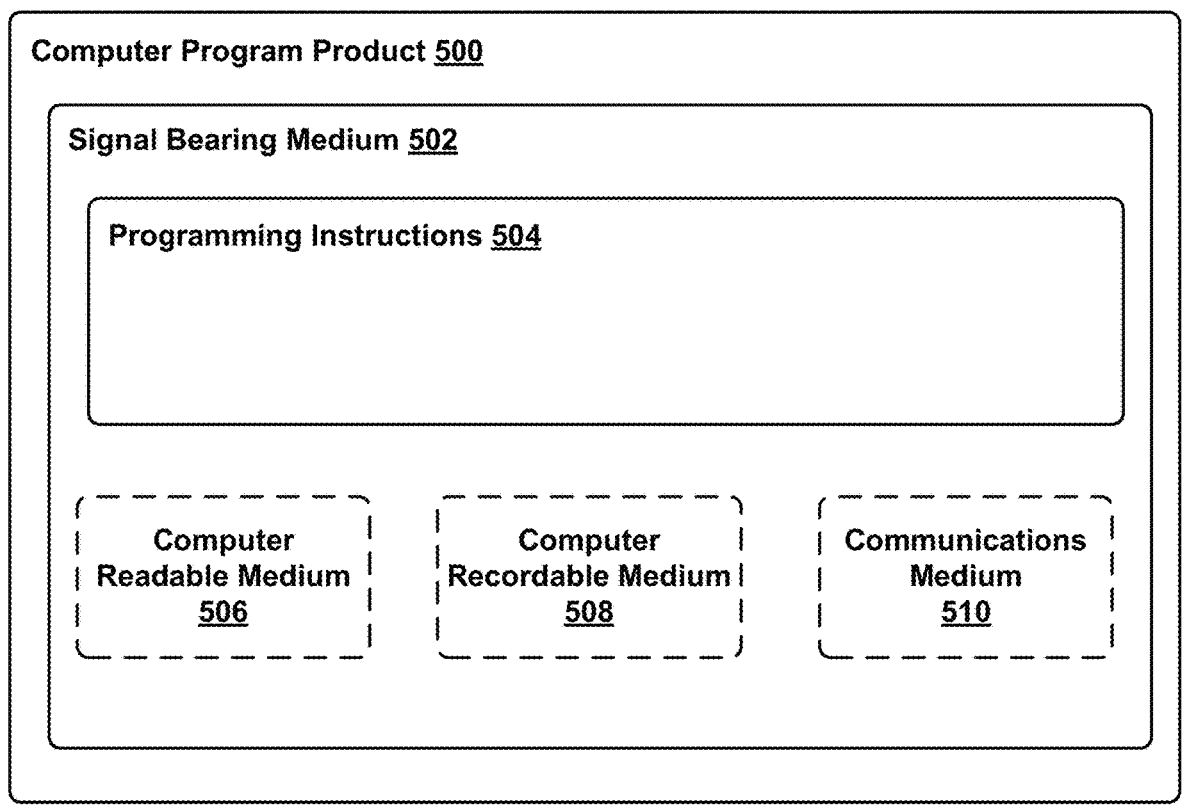
FIG. 5 is a schematic diagram of a computer program product in accordance with an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic diagram of a computer program product in accordance with an example embodiment. More specifically, FIG. 5 is a conceptual partial view of an example computer program product that includes a computer program for executing a computer process on a computer system.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method, comprising:
   receiving, by a computer system coupled to a vehicle, an input indicating a final destination, wherein the computer system is configured to control the vehicle in an autonomous mode, and wherein the vehicle is configured to transport one or more passengers based on the input;
   determining, by the computer system, that the final destination is not on a pre-approved road for travel by the vehicle in the autonomous mode based on map data representing a plurality of pre-approved roads for vehicles to use when operating in autonomous mode, wherein the vehicle is operable in the autonomous mode only when the vehicle is on one or more pre-approved roads;
   selecting, by the computer system, a route from a current location of the vehicle to an intermediary destination based on the map data representing the plurality of pre-approved roads for vehicles to use when operating in autonomous mode, wherein the route only comprises one or more pre-approved roads for travel by the vehicle in the autonomous mode, and wherein the intermediary destination comprises a facility for a temporary stay;
   navigating, by the computer system, the vehicle in the autonomous mode such that the vehicle traverses the one or more pre-approved roads of the route from the current location to the intermediary destination;
   parking, by the computing system, the vehicle at the intermediary destination; and
   after receiving an indication of a completion of the temporary stay, the computer system operating the vehicle in a user assist mode to reach the final destination.

2. The method of claim 1, wherein the intermediary destination is closer than the current location to the final destination.

3. The method of claim 2, wherein a route from the intermediary destination to the final destination comprises roads that are not provided in a database of the one or more pre-approved roads for travel.

4. The method of claim 1, further comprising:
   receiving, by the computer system, an input to administer an impairment test of a user; and
   upon receiving a result from the impairment test indicating impairment of the user, the computer system operating the vehicle in the autonomous mode.

5. The method of claim 4, further comprising:
   receiving, by the computer system, an input to administer a second impairment test of the user after completion of the temporary stay; and
   upon receiving a result from the second impairment test indicating non-impairment of the user, operating the vehicle in a user assist mode to the final destination.

6. The method of claim 1, further comprising making a determination to operate the vehicle in the autonomous mode in response to receiving an input to operate the vehicle in the autonomous mode.

7. The method of claim 1, further comprising making a determination to operate the vehicle in the autonomous mode in response to receiving an indication that a user is unable to assist with driving the vehicle.

8. The method of claim 1, further comprising:
   receiving, by the computer system, an indication that a user will be unable to assist with driving the vehicle in the future; and
   upon receiving the indication, providing a token or other measure of proof to the user indicating that the user provided the indication to the computer system of the vehicle.

9. A vehicle, comprising:
   one or more sensors, wherein the one or more sensors are configured to acquire sensor data relating to a current location of the vehicle, wherein the vehicle is configured to operate in an autonomous mode based on information from the one or more sensors;
   a user interface of the vehicle configured to obtain an indication of a final destination; and
   a computer system configured to:
      receive an input indicating a final destination, wherein the computer system is configured to control the vehicle in the autonomous mode, and wherein the vehicle is configured to transport one or more passengers based on the input;
      determine that the final destination is not on a pre-approved road for travel by the vehicle in the autonomous mode based on map data representing a plurality of pre-approved roads for vehicles to use when operating in autonomous mode, wherein the vehicle is operable in the autonomous mode only when the vehicle is on one or more pre-approved roads;
      select a route from a current location of the vehicle to an intermediary destination based on the map data representing the plurality of pre-approved roads for vehicles to use when operating in autonomous mode, wherein the route only comprises one or more pre-approved roads for travel by the vehicle in the autonomous mode, and wherein the intermediary destination comprises a facility for a temporary stay;
      navigate the vehicle in the autonomous mode such that the vehicle traverses the one or more pre-approved roads of the route from the current location to the intermediary destination;
      park the vehicle at the intermediary destination; and
      after receiving an indication of a completion of the temporary stay, operate the vehicle in a user assist mode to reach the final destination.

10. The vehicle of claim 9, wherein the route to the intermediary destination comprises one or more roads in a database of pre-approved roads for travel by the vehicle in the autonomous mode.

11. The vehicle of claim 10, wherein a route from the intermediary destination to the final destination comprises one or more roads not in the database of pre-approved roads.

12. The vehicle of claim 9, wherein the computer system is further configured to:

receive an input to administer an impairment test of a user; and upon receiving a result from the impairment test indicating impairment of the user, operate the vehicle in the autonomous mode.

13. The vehicle of claim 12, wherein the computer system is further configured to:

receive an input to administer a second impairment test of the user after completion of the temporary stay; and upon receiving a result from the second impairment test indicating non-impairment of the user, operate the vehicle in a user assist mode to the final destination.

14. The vehicle of claim 9, wherein the computer system is further configured to:

receive an indication that a user will be unable to assist with driving the vehicle in the future; and upon receiving the indication, provide a token or other measure of proof to the user indicating that the user provided the indication to the computer system of the vehicle.

15. A non-transitory computer readable medium having stored therein instructions executable by a computer system to cause the computer system to perform functions, the functions comprising:

receiving an input indicating a final destination, wherein the computer system is configured to control a vehicle in an autonomous mode, and wherein the vehicle is configured to transport one or more passengers based on the input;

determining that the final destination is not on a pre-approved road for travel by the vehicle in the autonomous mode based on map data representing a plurality of pre-approved roads for vehicles to use when operating in autonomous mode, wherein the vehicle is operable in the autonomous mode only when the vehicle is on one or more pre-approved roads;

selecting a route from a current location of the vehicle to an intermediary destination based on the map data representing the plurality of pre-approved roads for vehicles to use when operating in autonomous mode, wherein the route only comprises one or more pre-approved roads for travel by the vehicle in the autonomous mode, and wherein the intermediary destination comprises a facility for a temporary stay;

navigating the vehicle in the autonomous mode such that the vehicle traverses the one or more pre-approved roads of the route from the current location to the intermediary destination;

parking the vehicle at the intermediary destination; and after receiving an indication of a completion of the temporary stay, operating the vehicle in a user assist mode to reach the final destination.

16. The non-transitory computer readable medium of claim 15, wherein the route to the intermediary destination comprises roads provided in a database of pre-approved roads, and wherein the pre-approved roads are a subset of all roads available for use by vehicles.

17. The non-transitory computer readable medium of claim 15, wherein the functions further comprise:

making a determination to operate the vehicle in the autonomous mode in response to receiving an input to operate the vehicle in the autonomous mode.

18. The non-transitory computer readable medium of claim 15, wherein the functions further comprise:

receiving, by the computer system, an input to administer an impairment test of a user; and upon receiving a result from the impairment test indicating impairment of the user, the computer system operating the vehicle in the autonomous mode.

19. The non-transitory computer readable medium of claim 18, wherein the functions further comprise:

receiving, by the computer system, an input to administer a second impairment test of the user after completion of the temporary stay; and upon receiving a result from the second impairment test indicating non-impairment of the user, operating the vehicle in a user assist mode to the final destination.

* * * * *